US005830369A

United States Patent [19]

Toyama

[11] Patent Number: 5,830,369

[45] Date of Patent: Nov. 3, 1998

[54] SYSTEM FOR REUSING OILY SLURRY WASTE FLUID

[75] Inventor: Kohei Toyama, Shirakawa, Japan

[73] Assignee: Shin-Etsu Handotai Co., Ltd., Tokyo, Japan

[21] Appl. No.: 783,092

[22] Filed: Jan. 14, 1997

[30] Foreign Application Priority Data

Jan. 26, 1996 [JP] Japan .................................... 8-011587

[51] Int. Cl.[6] .................................................... B01D 21/26

[52] U.S. Cl. ....................... 210/773; 210/787; 210/512.1; 125/16.02

[58] Field of Search ................................ 210/512.1, 787, 210/781, 788, 789, 773, 772; 494/37, 53, 901; 125/16.01, 16.02

[56] References Cited

U.S. PATENT DOCUMENTS 3,802,916 4/1974 Jackson ..................................... 134/10
3,905,898 9/1975 Jackson .................................. 209/444
4,018,329 4/1977 Jarvis .
4,037,781 7/1977 High .
4,242,841 1/1981 Ushakov et al. .
5,125,966 6/1992 Siefert .................................... 210/108
5,154,831 10/1992 Darian et al. ........................... 210/804
5,310,399 5/1994 Suzuki ...................................... 494/54
5,490,531 2/1996 Bala et al. .............................. 210/787
5,547,376 8/1996 Harrel .
5,578,222 11/1996 Trischuk et al. ........................ 210/773
5,647,989 7/1997 Hayashi et al. ......................... 210/641
5,657,876 8/1997 Drenter et al. ....................... 209/223.1

*Primary Examiner*—Robert J. Popovics
*Attorney, Agent, or Firm*—Nikaido, Marmelstein, Murray & Oram LLP

[57] ABSTRACT

A system for reusing oily slurry waste fluid is capable of decreasing the total amount of oily slurry waste fluid to be discarded by collecting and reusing available abrasive grains, oil and water from the oily slurry waste fluid, thereby reducing the volume carbon dioxide generated when burning the oily slurry waste fluid and being an effective solution to the environmental problems.

8 Claims, 3 Drawing Sheets

SYSTEM FOR REUSING OILY SLURRY WASTE FLUID

BACKGROUND OF THE INVENTION

1. Field of the Invention

The present invention relates to a system which enables the reuse of oily slurry waste fluid used when brittle materials, for example, semiconductor ingots such as compound semiconductor crystal ingots and silicon semiconductor crystal ingots are sliced with a wire saw slicing apparatus.

2. Description of the Related Art

There is known a wire saw slicing apparatus as a means for slicing brittle materials such as compound semiconductor crystal ingots and silicon semiconductor crystal ingots. The wire saw slicing apparatus, as shown in FIG. 3, includes three plastic main rollers 10A, 10B and 10C of the identical construction disposed with their axes parallel spaced from one another, and a wire 12 wound spirally around helical grooves 14*a*, 14*b* and 14*c* formed at regular intervals or pitches in the respective outer peripheral surfaces of the main rollers 10A–10C. The main rollers may be plural in number and should by no means be limited to any particular number, but four or three main rollers as in the illustrated embodiment are used in general. The main roller 10C constitutes a drive roller and is connected in driven relation to a drive motor 16. A rotary motion of the main roller 10C is transmitted via the wire 12 to the remaining main rollers 10A, 10B which constitute driven rollers.

The wire 12 has one or a leading end portion wound around a wire reel bobbin 22 via a tension adjustment mechanism 20. The wire reel bobbin 22 is rotatably driven by a torque motor 24. A tension on a portion of the wire 12 extending between the tension adjustment mechanism 20 and the wire reel bobbin 22 is regulated according to a voltage applied to the torque motor 24. And, a tension on a portion of the wire 12 running between the tension adjustment mechanism 20 and the drive roller 10C is adjusted at a constant value by the tension adjustment mechanism 20.

Similarly, the opposite or a trailing end portion of the wire 12 is wound around a wire reel bobbin 32 via a tension adjustment mechanism 30. The wire reel bobbin 32 is rotatably driven by a torque motor 34. A tension on a portion of the wire 12 extending between the tension adjustment mechanism 30 and the wire reel bobbin 32 is regulated according to a voltage applied to the torque motor 34. And, a tension on a portion of the wire 12 running between the tension adjustment mechanism 30 and the drive roller 10C is adjusted at a constant value by the tension adjustment mechanism 30.

A workpiece 40 is composed, for example, of a semiconductor single crystal ingot having an orientation flat and attached by bonding to a workpiece holder 42 via the orientation flat. The workpiece holder 42 is vertically moved up and down along a linear path.

The wire saw slicing apparatus of the above construction operates as follows. The drive roller 10C is rotated by the drive motor 16 to reciprocate the wire 12 in the axial or longitudinal direction thereof. A working fluid containing abrasive grains is supplied to a contact area between workpiece 40 and the wire 12. While keeping this condition, the workpiece 40 is further moved downwards whereby the workpiece 40 is sliced at one time into a multiplicity of wafers by a lapping action attained by the reciprocating wire 12 and the abrasive-containing working fluid supplied thereto.

An oily slurry, which contains oil (oily coolant) based on mineral oil and abrasive grains as of SiC, is used as the above-mentioned working fluid. The used oily slurry becomes oily slurry waste fluid which is generally burnt as industrial waste. The problem in treating the oily slurry waste fluid is that the viscosity thereof is high and hence there is no method of easy separation to oil and abrasive grains by a usual filtration means. Therefore, in the conventional treatment, the oily slurry waste fluid has been predominantly burnt as industrial waste. However, since carbon dioxide ($CO_2$) generated when burning the oily slurry waste fluid is listed as a cause of environmental problems such as earth warming, the burning thereof is not desirable.

SUMMARY OF THE INVENTION

With the foregoing problems in view, it is an object of the present invention to provide a novel system for reusing oily slurry waste fluid which is capable of decreasing the total amount of the oily slurry waste fluid to be discarded by collecting and reusing available abrasive grains, oil and water from the oily slurry waste fluid, thereby reducing the volume of carbon dioxide generated when burning the oily slurry waste fluid and being an effective solution to the environmental problems.

To achieve the above-mentioned object, the system for reusing oily slurry waste fluid comprises the steps of (a) decreasing viscosity of oily slurry waste fluid containing oil and abrasive grains by adding water thereto, (b) firstly separating available abrasive grains and waste liquid consisting of a suspended solid part and a liquid part containing oil and water from the oily slurry waste fluid of low viscosity and (c) finally separating solid-liquid three phases of the suspended solid part, oil and water from the waste liquid consisting of the suspended solid part and the liquid part, thereafter the suspended solid part being discarded as useless sludge; wherein the firstly separated available abrasive grains and the finally separated oil and water are reused.

The oily slurry waste fluid, the viscosity of which is decreased to 30 mPa · s or less by adding water, is easily subjected to solid-liquid separation with a centrifugal separating machine. The lower viscosity of the oily slurry waste fluid, the easier solid-liquid separation. The amount of the oily slurry waste fluid to be subjected to solid-liquid separation increases with the increase of the amount of the water to be added thereto so as to decrease the viscosity thereof and hence the treatment efficiency disadvantageously decreases to the extent of the added water. The viscosity of the oily slurry waste fluid is desirably 20 mPa · s or above from an economical view point.

In the case where the above-mentioned step (b) is conducted by the use of a liquid cyclone, the firstly separated abrasive grains contain advantageously available abrasive grains alone which can be reused but do not contain minute abrasive grains which are smaller than the available abrasive grains in terms of their grain size and can not be reused.

The operation of separating solid-liquid three phases of the suspended solid part, oil and water from the waste fluid in the above-mentioned step (c) is preferably carried out with a screw decanter type centrifugal separating machine. By using the screw decanter type centrifugal separating machine, the waste liquid is separated to solid-liquid three phases of the suspended solid part (useless sludge), oil and water at one operation.

The above and other objects, features and advantages of the present invention will become manifest to those versed in the art upon making reference to the detailed description and the accompanying sheets of drawings.

DETAILED DESCRIPTION OF THE INVENTION

The present invention will be described below in greater detail by way of the following examples which should be construed as illustrative rather than restrictive.

Figure 1:
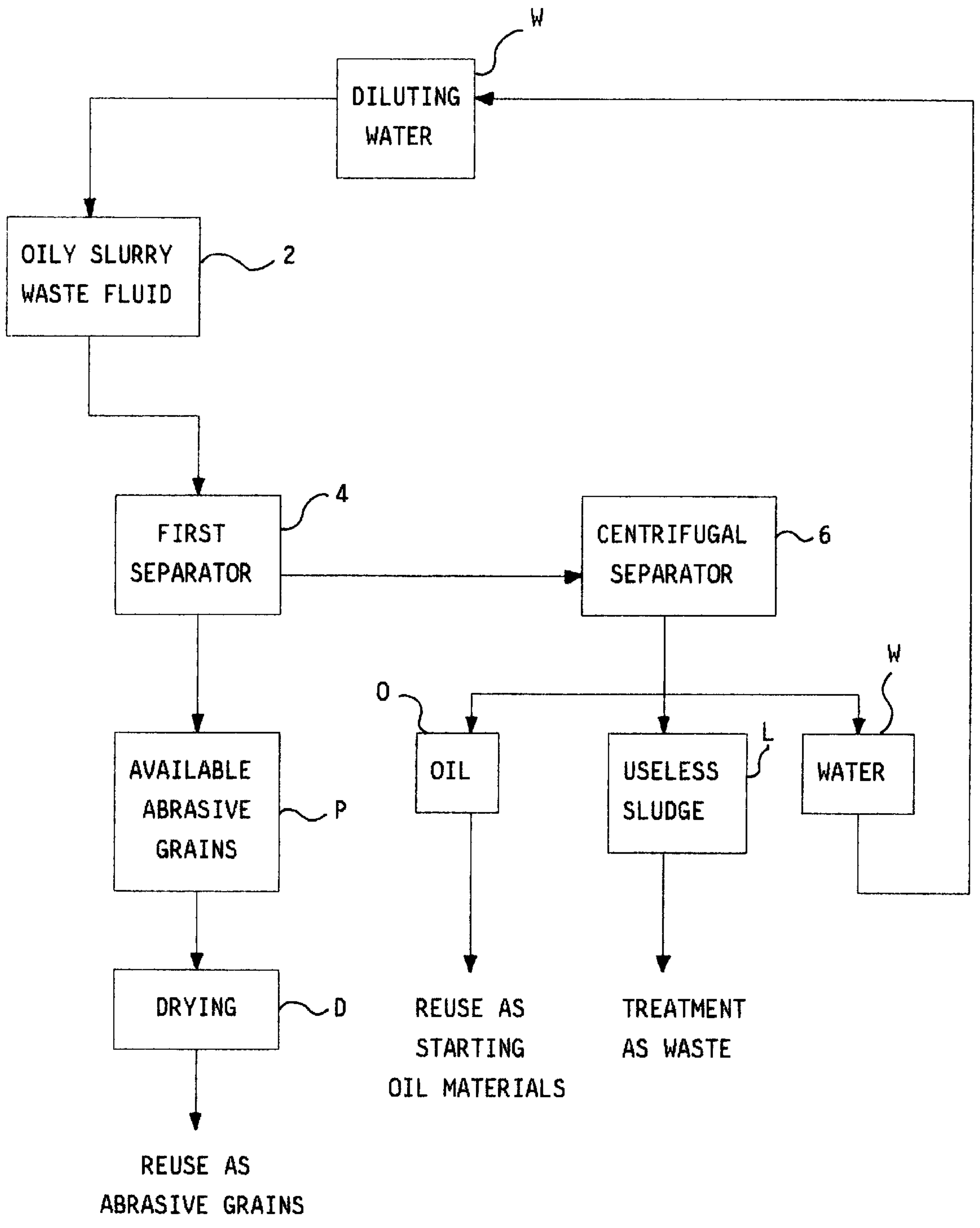
FIG.1 is a block diagram showing one example of the construction of a system for reusing oily slurry waste fluid according to the present invention.
Figure 2:
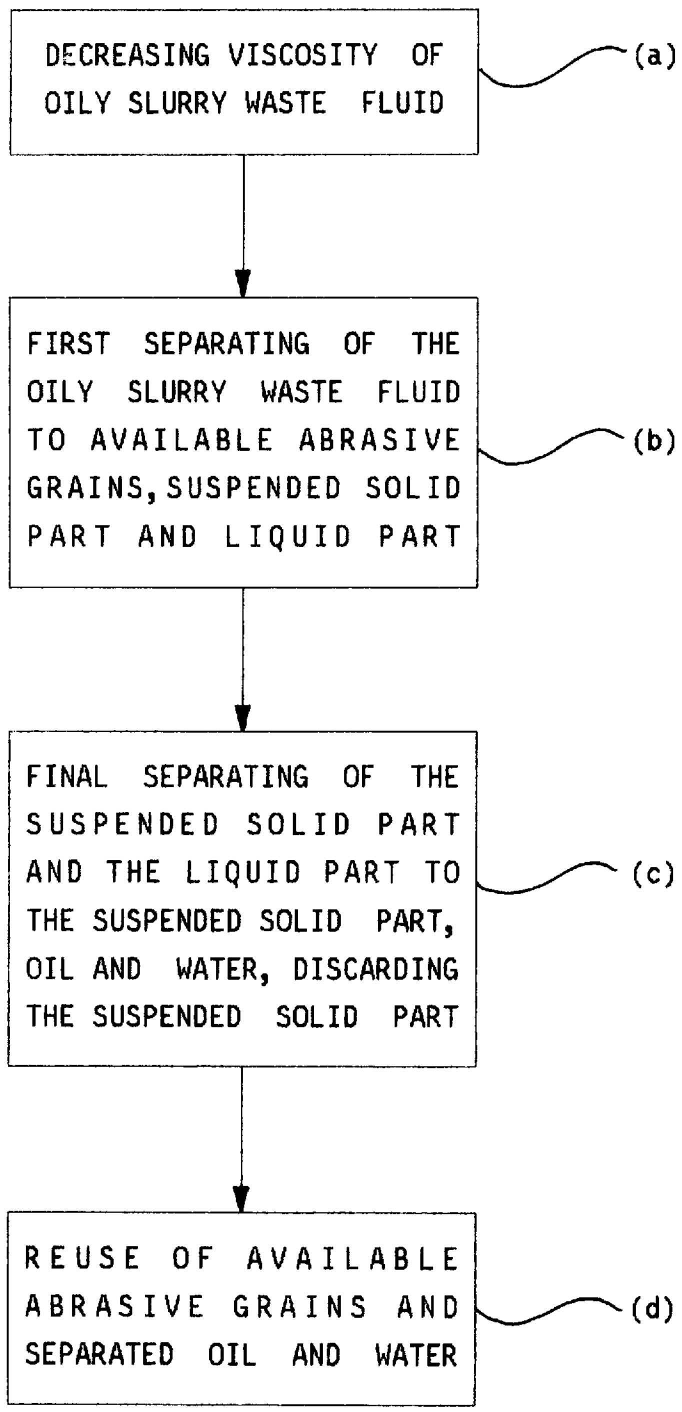
FIG.2 is a flow chart showing one example of order of steps in the system for reusing oily slurry waste fluid.
Figure 3:
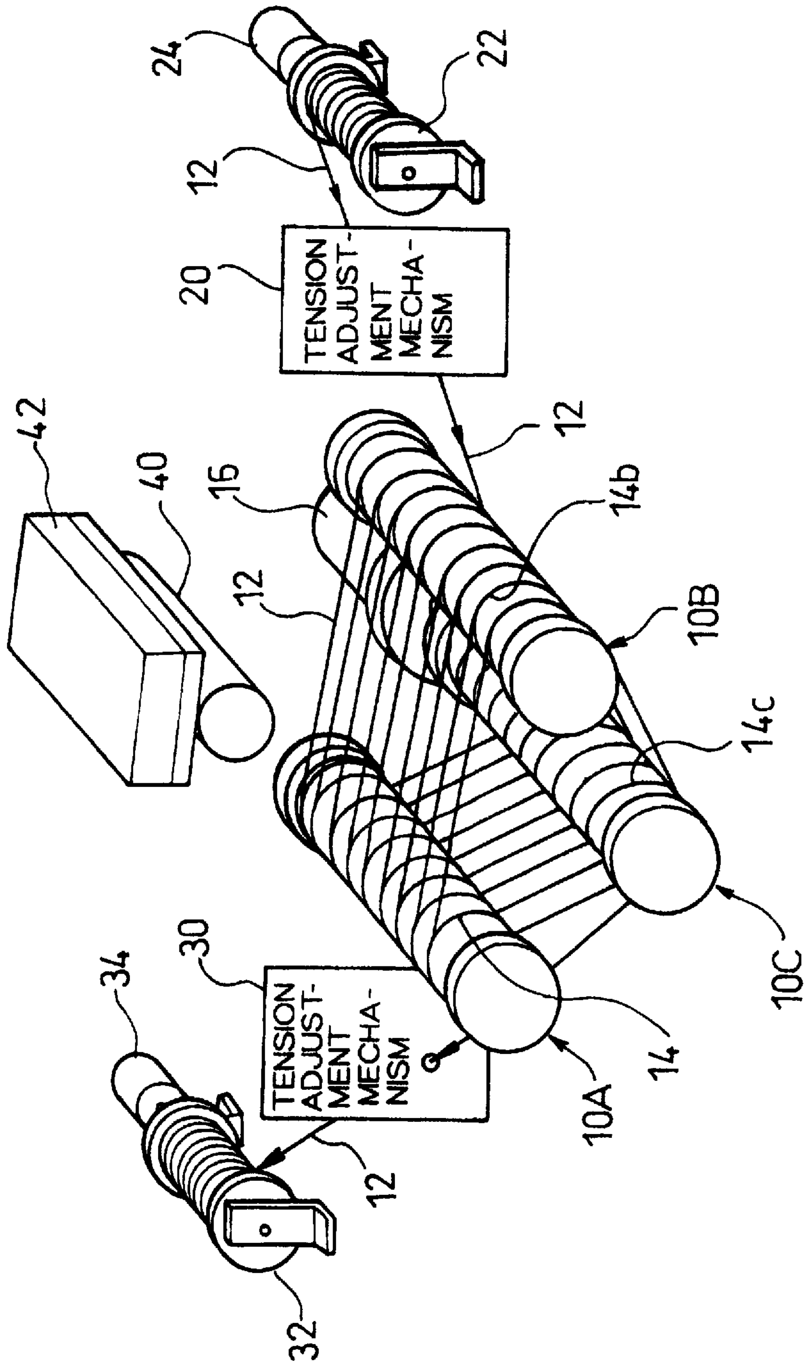
FIG. 3 PRIOR ART
FIG.3 is a diagrammatical perspective view of a main portion of a wire saw slicing apparatus.

In FIG.1, numeral 2 is oily slurry waste fluid which is stored in a waste slurry tank. Oil based on mineral oil which is used as an oily slurry contains a dispersing agent or the like which can disperse abrasive grains. The oily slurry waste fluid has very high viscosity of 200–300 mPa · s due to the presence of slicing scraps of the workpiece. Accordingly, it is impossible to separate the oily slurry waste fluid in its original condition into solid-liquid phases with centrifugal separating machines, filter systems or the like which are generally used for such separation.

It is conventionally known to decrease the oily slurry waste fluid 2 by the use of kerosene or the like. However, the amount of the oil in the oily slurry waste fluid has finally increased by the addition of kerosene and the oily slurry waste fluid containing the added kerosene is also burnt as in a conventional way.

In the present invention, the oily slurry waste fluid 2 is diluted by adding water of about ½~2times the volume of the oily slurry waste fluid 2, thereby the viscosity thereof drops to 20–30 mPa · s. That is, the step (a) where the viscosity of the oily slurry waste fluid 2 is decreased is carried out for a starter. The oily slurry waste fluid of low viscosity can be subjected to solid-liquid separation.

The oily slurry waste fluid 2 having low viscosity of 20–30 mPa · s is then firstly separated with a first separator 4 to available abrasive grains (P) and waste liquid consisting of a SS (Suspended Solid) part (or a floating solid part) and a liquid part [oil(O)+water(W)]. That is, the step (b) where the available abrasive grains (P) and the waste liquid consisting of a SS part and a liquid part [oil(O)+water(W)] are firstly separated from the oily slurry waste fluid 2 of low viscosity is carried out.

In this first separation of the step (b), a liquid cyclone is preferably usable. In the liquid cyclone, a working fluid containing in a suspension state abrasive grains smaller than predetermined grain size, for instance, of 6 μm or less is discharged from an upper outlet and a working fluid containing in a suspension state abrasive grains larger than predetermined grain size, for instance, of 6 μm or more is discharged from a lower outlet (for example, Japanese Patent Publication No. 7-41535). For this liquid cyclone type separating machine, a SRS system (tradename for a liquid cyclone type separating machine manufactured by HITACHI ZOSEN METAL WORKS CO., LTD.) is preferably usable. In the case where the first separation is conducted by the use of centrifugal separating machines which are generally used, the firstly separated abrasive grains contain minute abrasive grains which are smaller than the available abrasive grains in terms of their grain size and hence are not reusable.

However, with the separation by the use of the liquid cyclone, the firstly separated abrasive grains contain advantageously available abrasive grains alone which can be reused but do not contain minute abrasive grains which are smaller than the available abrasive grains in terms of their grain size and can not be reused. The available abrasive grains (P) denotes reusable abrasive grains larger than predetermined grain size, for instance, of 6 μm or more. The minute abrasive grains having grain size, for instance, of less than 6 μm can not be reusable.

The waste liquid consisting of the SS part (the suspended solid part) and the liquid part from the first separator 4 is then finally separated to solid-liquid three phases of the SS part, oil (O) and water (W) by the use of a centrifugal separator 6, the SS part is treated as useless sludge (waste). In this final separation, for the centrifugal separator 6, a screw decanter type centrifugal separator (TP series) (tradename for a screw decanter type centrifugal separator manufactured by ISHIKAWAJIMA-HARIMA HEAVY INDUSTRY CO., LTD.) is preferably usable. That is, the step (c) where the waste liquid consisting of the suspended solid part and the liquid part is separated to solid-liquid three phases of the suspended solid, oil (O) and water (W) at one operation, the suspended solid part being discarded as useless sludge L is carried out.

With the above-mentioned operation, the oily slurry waste fluid 2 is separated to available abrasive grains (P), useless sludge (L), oil (O) and water (W). The available abrasive grains (P) is dried up at a low temperature of about 60° C. in a drying step (D) and reused. The collected oil (O) is reused as raw oil materials for the wire saw slicing apparatus. The collected water (W) is reused for dilution of the oily slurry waste fluid 2. Thus, the oily slurry waste fluid 2 is not burnt but is recycled. In the present invention, the amount of the useless sludge exhausted from the oily slurry waste fluid is reduced to ⅕ (by weight) in comparison with that in the conventional method.

As described above, the present invention is capable of decreasing the total amount of oily slurry waste fluid to be discarded by collecting and reusing available abrasive grains, oil and water from the oily slurry waste fluid, thereby reducing the volume of carbon dioxide generated when burning the oily slurry waste fluid and being an effective solution to the environmental problems.

Obviously, various minor changes and modifications of the present invention are possible in the light of the above teaching. It is therefore to be understood that within the scope of appended claims the invention may be practiced otherwise than as specifically described.

What is claimed is:

1. A method for reusing oily slurry waste fluid which comprises the steps of:

(a) decreasing viscosity of oily slurry waste fluid containing oil and abrasive grains by adding water thereto;

(b) firstly separating available abrasive grains and waste liquid consisting of a suspended solid part and a liquid part containing oil and water from the oily slurry waste fluid of low viscosity;

(c) finally separating solid-liquid three phases of the suspended solid part, oil and water from the waste liquid in one step thereafter discarding the suspended solid part as useless sludge; and (d) reusing the firstly separated available abrasive grains, the finally separated oils, and the finally separated water.

2. The method for reusing oily slurry waste fluid according to claim 1, wherein the viscosity of the oily slurry waste fluid to which water has been added is within the range of 20 to 30 mPa · s.

3. The method for reusing oily slurry waste fluid according to claim 1, wherein step (b) is carried out with a liquid cyclone.

4. The method for reusing oily slurry waste fluid according to claim 2, wherein step (b) is carried out with a liquid cyclone.

5. The method for reusing oily slurry waste fluid according to claim 1, wherein the separating solid-liquid three phases of the suspended solid part, oil and water from the waste liquid step (c) is carried out with a screw decanter type centrifugal separating machine.

6. The method for reusing oily slurry waste fluid according to claim 2, wherein the separating solid-liquid three phases of the suspended solid part, oil and water from the waste liquid step (c) is carried out with a screw decanter type centrifugal separating machine.

7. The method for reusing oily slurry waste fluid according to claim 3, wherein the separating solid-liquid three phases of the suspended solid part, oil and water from the waste liquid step (c) is carried out with a screw decanter type centrifugal separating machine.

8. The method for reusing oily slurry waste fluid according to claim 4, wherein the separating solid-liquid three phases of the suspended solid part, oil and water from the waste liquid step (c) is carried out with a screw decanter type centrifugal separating machine.

* * * * *

UNITED STATES PATENT AND TRADEMARK OFFICE

CERTIFICATE OF CORRRECTION

PATENT NO. : 5,830,369
DATED : November 3, 1998
INVENTOR(S) : Kohei Toyama

It is certified that error appears in the above-identified patent and that said Letters Patent is hereby corrected as shown below:

On the title page,item [56], insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 4 | 0 | 5 | 9 | 9 | 2 | 9 | 11/29/77 | Bishop | | | |
| | | 4 | 3 | 6 | 1 | 4 | 8 | 8 | 11/30/82 | White et al | | | |
| | | | | | | | | | | | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION | |
|---|---|---|---|---|---|---|---|---|---|---|---|---|---|---|
| | | | | | | | | | | | | | YES | NO |
| | | 4 | 4 | 0 | 5 | 8 | 2 | 9 | 8/31/95 | Germany | | | | |
| | | 3 | 2 | 1 | 2 | 1 | 2 | 0 | 10/6/83 | Germany | | | | |
| | | | | | | | | | | | | | | |

OTHER REFERENCES(Including Author, Title, Date, Pertinent Pages, Etc.)

| |
|---|
| Patent Abstracts of Japan, Vol. 009, No. 111 (M-379), May 15, 1985 & JP 59-232726A (Hitachi Seisakusho KK, Others: 01), December 27, 1984 |
| Patent Abstracts of Japan, Vol. 007, No. 034 (C-150), February 10, 1983 & JP 57-185375A (Citizen Tokei KK), November 15, 1982 |

Signed and Sealed this

Eighth Day of February, 2000

*Attest:*

Q. TODD DICKINSON

*Attesting Officer*

*Commissioner of Patents and Trademarks*